US011339992B2

(12) United States Patent
Patil et al.

(10) Patent No.: US 11,339,992 B2
(45) Date of Patent: May 24, 2022

(54) SENSOR MOUNT FOR HVAC SYSTEM

(71) Applicant: Johnson Controls Technology Company, Auburn Hills, MI (US)

(72) Inventors: Gaurav S. Patil, Pune (IN); Naushad Parapurath Monangat, Pune (IN)

(73) Assignee: Johnson Controls Tyco IP Holdings LLP, Milwaukee, WI (US)

( * ) Notice: Subject to any disclaimer, the term of this patent is extended or adjusted under 35 U.S.C. 154(b) by 428 days.

(21) Appl. No.: 16/388,654

(22) Filed: Apr. 18, 2019

(65) Prior Publication Data
US 2020/0326093 A1 Oct. 15, 2020

Related U.S. Application Data

(60) Provisional application No. 62/832,110, filed on Apr. 10, 2019.

(51) Int. Cl.
| | |
|---|---|
| *F24F 11/89* | (2018.01) |
| *G01D 11/30* | (2006.01) |
| *F24F 110/20* | (2018.01) |
| *F24F 110/70* | (2018.01) |
| *F24F 110/10* | (2018.01) |
| *F24F 13/20* | (2006.01) |

(52) U.S. Cl.
CPC .............. *F24F 11/89* (2018.01); *G01D 11/30* (2013.01); *F24F 2013/207* (2013.01); *F24F 2110/10* (2018.01); *F24F 2110/20* (2018.01); *F24F 2110/70* (2018.01)

(58) Field of Classification Search
CPC ........................................ F24F 11/89
See application file for complete search history.

(56) References Cited

U.S. PATENT DOCUMENTS

| | | | |
|---|---|---|---|
| 6,254,008 B1 | 7/2001 | Erickson et al. | |
| 6,554,697 B1* | 4/2003 | Koplin | G06F 1/206 454/184 |
| 8,955,344 B2 | 2/2015 | Kostelecky et al. | |
| 2014/0097266 A1* | 4/2014 | Habbel | B65D 83/303 239/66 |
| 2020/0056793 A1* | 2/2020 | Etemadi | F23N 5/245 |

FOREIGN PATENT DOCUMENTS

JP 5302794 B2 10/2013

* cited by examiner

*Primary Examiner* — Paul M. West
(74) *Attorney, Agent, or Firm* — Fletcher Yoder, P.C.

(57) ABSTRACT

The present disclosure is related to a sensor mounting assembly for a heating, ventilation, and/or air conditioning (HVAC) unit that includes a cover configured to couple to a panel of the HVAC unit and occlude an opening formed in the panel and a sensor support configured to couple to the cover and support a sensor coupled to the sensor support. The sensor support is also configured to extend into the HVAC unit via the opening in an installed configuration of the sensor mounting assembly.

26 Claims, 10 Drawing Sheets

SENSOR MOUNT FOR HVAC SYSTEM

CROSS REFERENCE TO RELATED APPLICATIONS

This application claims priority from and the benefit of U.S. Provisional Application Ser. No. 62/832,110, entitled "SENSOR MOUNT FOR HVAC SYSTEM," filed Apr. 10, 2019, which is hereby incorporated by reference in its entirety for all purposes.

BACKGROUND

This section is intended to introduce the reader to various aspects of art that may be related to various aspects of the present disclosure, which are described below. This discussion is believed to be helpful in providing the reader with background information to facilitate a better understanding of the various aspects of the present disclosure. Accordingly, it should be understood that these statements are to be read in this light, and not as admissions of prior art.

Heating, ventilation, and/or air conditioning (HVAC) systems are utilized in residential, commercial, and industrial environments to control environmental properties, such as temperature and humidity, for occupants of the respective environments. An HVAC system may control the environmental properties through control of an air flow delivered to the environment. For example, the HVAC system may place the air flow in a heat exchange relationship with a refrigerant to condition the air flow. The HVAC system may then deliver the conditioned air flow to a space serviced by the HVAC system. In some embodiments, the HVAC system may include sensors that detect or determine operating conditions or parameters of the HVAC system, such as a temperature, humidity, and/or composition of air flows. However, placement of and/or access to the sensors may be difficult, which may increase the complexity of installing or replacing the sensors.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a sensor mounting assembly for a heating, ventilation, and/or air conditioning (HVAC) unit includes a cover configured to couple to a panel of the HVAC unit and occlude an opening formed in the panel and a sensor support configured to couple to the cover and support a sensor coupled to the sensor support. The sensor support is also configured to extend into the HVAC unit via the opening in an installed configuration of the sensor mounting assembly.

In another embodiment, a heating, ventilation, and/or air conditioning (HVAC) unit includes a housing configured to receive an air flow directed through the HVAC unit, and the housing includes a panel and an opening formed in the panel. The HVAC unit further includes a sensor mounting assembly that includes a first plate configured to couple to an exterior surface of the panel and occlude the opening, and a second plate configured to couple to the first plate and extend through the opening into the housing, wherein the second plate is configured to couple to a sensor.

In another embodiment, a sensor mounting system for a heating, ventilation, and/or air conditioning (HVAC) unit includes a cover configured to couple to a panel of the HVAC unit and align with an opening formed in the panel. The sensor mounting system further includes a first sensor support and a second sensor support. The first sensor support it configured to couple to the cover and has a first plurality of sensor support holes arranged in a first orientation on the first sensor support. The second sensor support is configured to couple to the cover and has a second plurality of sensor support holes arranged in a second orientation on the second sensor support that is different than the first orientation. The first sensor support and the second sensor support are configured to separately couple to the cover.

DRAWINGS

Various aspects of this disclosure may be better understood upon reading the following detailed description and upon reference to the drawings in which.

DETAILED DESCRIPTION

Figure 1:
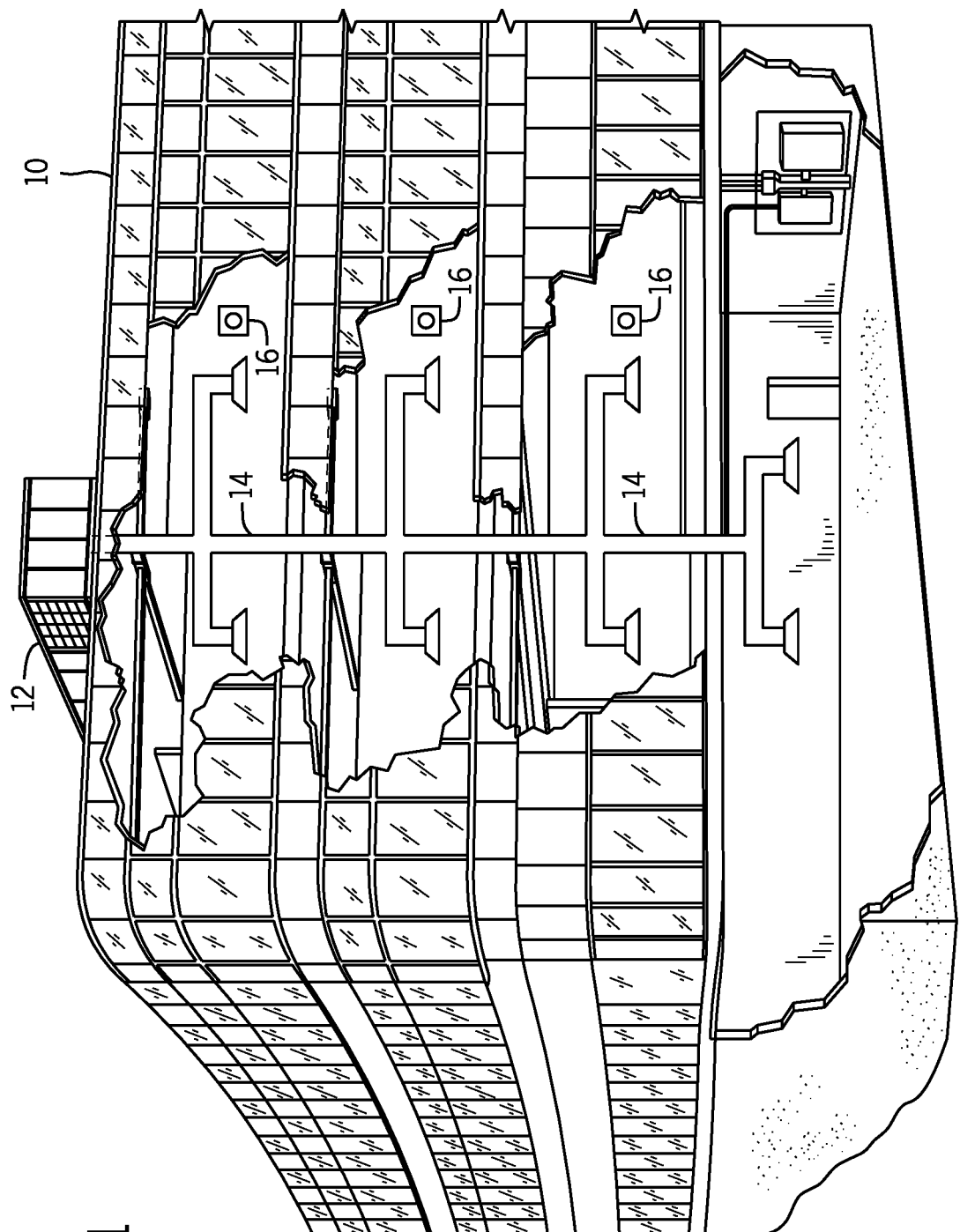
FIG. 1 is a perspective view of an embodiment of a heating, ventilation, and/or air conditioning (HVAC) system for environmental management that may employ one or more HVAC units, in accordance with an aspect of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

The present disclosure is directed to a sensor mounting assembly for a heating, ventilation, and/or air conditioning (HVAC) system configured to condition and deliver an air flow to a structure, such as a building or a residential home. For example, the HVAC system may receive a return air flow from the structure, detect or determine a parameter of the return air flow, and condition the return air flow based on the parameter, such as to change a temperature and/or humidity of the return air flow. The HVAC system may then deliver the conditioned air flow to the structure as a supply air flow.

In some embodiments, the HVAC system includes one or more sensors that are each configured to detect an operating parameter of the air flows circulating in the HVAC system. For example, the HVAC system may include a temperature sensor, a carbon dioxide ($CO_2$) sensor, a humidity sensor, a pressure sensor, a smoke sensor, and/or any other suitable type of sensor. In some cases, the sensors may be positioned at different locations internally within the HVAC system, and the sensors may not be placed proximate to one another. Moreover, for certain HVAC systems, access to an interior the HVAC system may be limited or restricted. Thus, sensor accessibility within the HVAC system may be difficult. As a result, the time associated with installing, replacing, or otherwise configuring the sensors may be increased.

Accordingly, embodiments of the present disclosure are directed to a sensor mounting assembly that may be implemented with the HVAC system to enable improved access to sensors of the HVAC system. In some embodiments, multiple sensors of the HVAC system may be coupled to the sensor mounting assembly. Thus, accessing the sensor mounting assembly may enable access to each of the multiple sensors, which may therefore decrease a total time associated with locating and accessing the multiple sensors. Additionally, the sensor mounting assembly may be readily accessed from an exterior of the HVAC system, which may enable improved accessibility to the sensors. In this manner, the sensor mounting system may decrease the time associated with installing or replacing sensors of the HVAC system.

Further, while the disclosed embodiments of the sensor mounting assembly are described below in the context of applications utilizing sensors configured to detect parameters associated with air flows, it should be noted that embodiments of the sensor mounting assembly may be utilized with sensors of other types, such as vibration sensors, electrical sensors, magnetic sensors, light sensors, motion sensors, or any other sensors that may be used in an HVAC system.

Turning now to the drawings, FIG. 1 illustrates an embodiment of a heating, ventilation, and/or air conditioning (HVAC) system for environmental management that may employ one or more HVAC units. As used herein, an HVAC system includes any number of components configured to enable regulation of parameters related to climate characteristics, such as temperature, humidity, air flow, pressure, air quality, and so forth. For example, an "HVAC system" as used herein is defined as conventionally understood and as further described herein. Components or parts of an "HVAC system" may include, but are not limited to, all, some of, or individual parts such as a heat exchanger, a heater, an air flow control device, such as a fan, a sensor configured to detect a climate characteristic or operating parameter, a filter, a control device configured to regulate operation of an HVAC system component, a component configured to enable regulation of climate characteristics, or a combination thereof. An "HVAC system" is a system configured to provide such functions as heating, cooling, ventilation, dehumidification, pressurization, refrigeration, filtration, or any combination thereof. The embodiments described herein may be utilized in a variety of applications to control climate characteristics, such as residential, commercial, industrial, transportation, or other applications where climate control is desired.

In the illustrated embodiment, a building 10 is air conditioned by a system that includes an HVAC unit 12. The building 10 may be a commercial structure or a residential structure. As shown, the HVAC unit 12 is disposed on the roof of the building 10; however, the HVAC unit 12 may be located in other equipment rooms or areas adjacent the building 10. The HVAC unit 12 may be a single package unit containing other equipment, such as a blower, integrated air handler, and/or auxiliary heating unit. In other embodiments, the HVAC unit 12 may be part of a split HVAC system, such as the system shown in FIG. 3, which includes an outdoor HVAC unit 58 and an indoor HVAC unit 56.

The HVAC unit 12 is an air cooled device that implements a refrigeration cycle to provide conditioned air to the building 10. Specifically, the HVAC unit 12 may include one or more heat exchangers across which an air flow is passed to condition the air flow before the air flow is supplied to the building. In the illustrated embodiment, the HVAC unit 12 is a rooftop unit (RTU) that conditions a supply air stream, such as environmental air and/or a return air flow from the building 10. After the HVAC unit 12 conditions the air, the air is supplied to the building 10 via ductwork 14 extending throughout the building 10 from the HVAC unit 12. For example, the ductwork 14 may extend to various individual floors or other sections of the building 10. In certain embodiments, the HVAC unit 12 may be a heat pump that provides both heating and cooling to the building with one refrigeration circuit configured to operate in different modes. In other embodiments, the HVAC unit 12 may include one or more refrigeration circuits for cooling an air stream and a furnace for heating the air stream.

A control device 16, one type of which may be a thermostat, may be used to designate the temperature of the conditioned air. The control device 16 also may be used to control the flow of air through the ductwork 14. For example, the control device 16 may be used to regulate operation of one or more components of the HVAC unit 12 or other components, such as dampers and fans, within the building 10 that may control flow of air through and/or from the ductwork 14. In some embodiments, other devices may be included in the system, such as pressure and/or temperature transducers or switches that sense the temperatures and pressures of the supply air, return air, and so forth. Moreover, the control device 16 may include computer systems that are integrated with or separate from other building control or monitoring systems, and even systems that are remote from the building 10.

Figure 2:
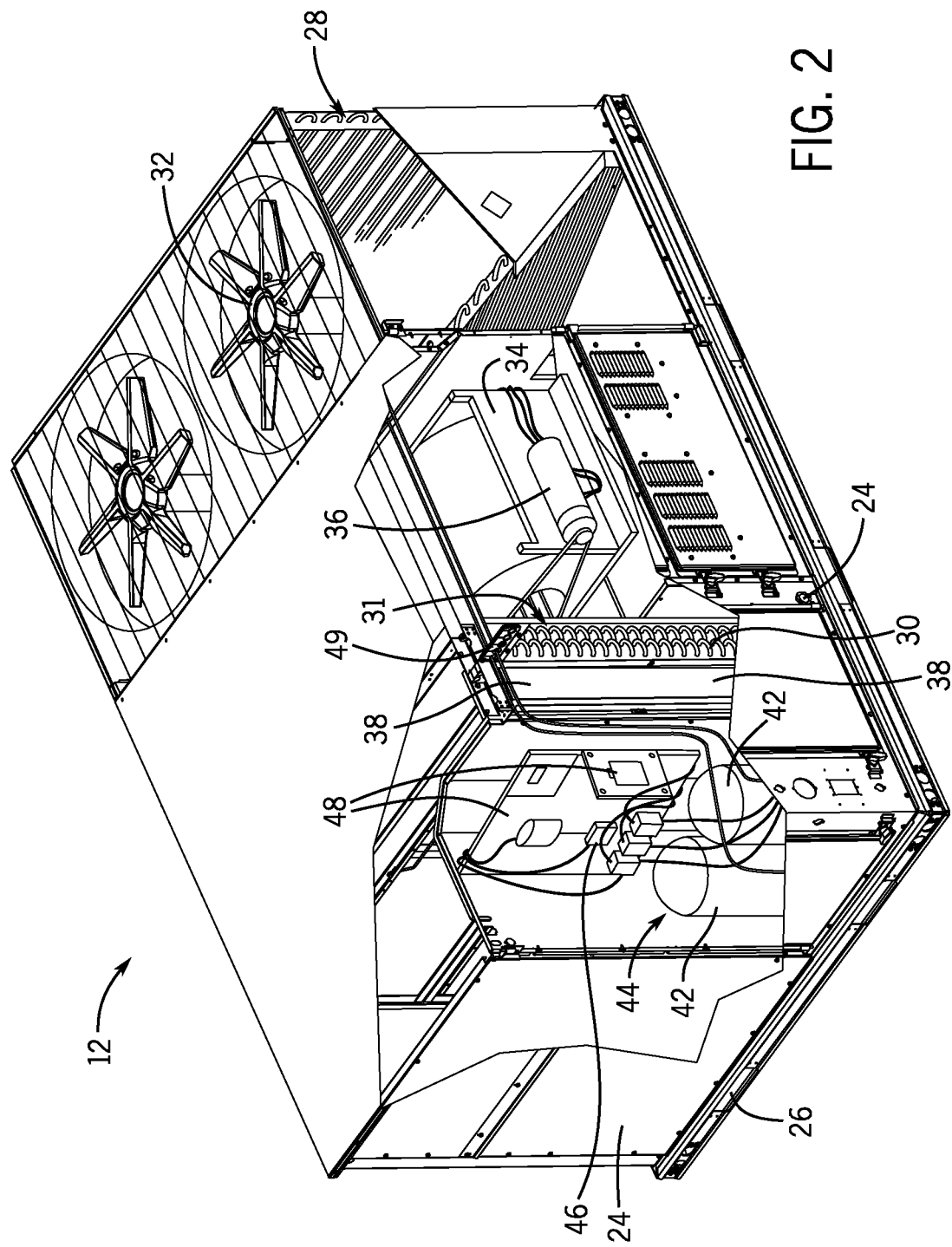
FIG. 2 is a perspective view of an embodiment of a packaged HVAC unit that may be used in an HVAC system, in accordance with an aspect of the present disclosure.

FIG. 2 is a perspective view of an embodiment of the HVAC unit 12. In the illustrated embodiment, the HVAC unit 12 is a single package unit that may include one or more independent refrigeration circuits and components that are tested, charged, wired, piped, and ready for installation. The HVAC unit 12 may provide a variety of heating and/or cooling functions, such as cooling only, heating only, cooling with electric heat, cooling with dehumidification, cooling with gas heat, or cooling with a heat pump. As described above, the HVAC unit 12 may directly cool and/or heat an air stream provided to the building 10 to condition a space in the building 10.

As shown in the illustrated embodiment of FIG. 2, a cabinet 24 encloses the HVAC unit 12 and provides structural support and protection to the internal components from environmental and other contaminants. In some embodiments, the cabinet 24 may be constructed of galvanized steel and insulated with aluminum foil faced insulation. Rails 26 may be joined to the bottom perimeter of the cabinet 24 and provide a foundation for the HVAC unit 12. In certain embodiments, the rails 26 may provide access for a forklift and/or overhead rigging to facilitate installation and/or removal of the HVAC unit 12. In some embodiments, the rails 26 may fit into "curbs" on the roof to enable the HVAC unit 12 to provide air to the ductwork 14 from the bottom of the HVAC unit 12 while blocking elements such as rain from leaking into the building 10.

The HVAC unit 12 includes heat exchangers 28 and 30 in fluid communication with one or more refrigeration circuits. Tubes within the heat exchangers 28 and 30 may circulate refrigerant, such as R-410A, through the heat exchangers 28 and 30. The tubes may be of various types, such as multichannel tubes, conventional copper or aluminum tubing, and so forth. Together, the heat exchangers 28 and 30 may implement a thermal cycle in which the refrigerant undergoes phase changes and/or temperature changes as it flows through the heat exchangers 28 and 30 to produce heated and/or cooled air. For example, the heat exchanger 28 may function as a condenser where heat is released from the refrigerant to ambient air, and the heat exchanger 30 may function as an evaporator where the refrigerant absorbs heat to cool an air stream. In other embodiments, the HVAC unit 12 may operate in a heat pump mode where the roles of the heat exchangers 28 and 30 may be reversed. That is, the heat exchanger 28 may function as an evaporator and the heat exchanger 30 may function as a condenser. In further embodiments, the HVAC unit 12 may include a furnace for heating the air stream that is supplied to the building 10. While the illustrated embodiment of FIG. 2 shows the HVAC unit 12 having two of the heat exchangers 28 and 30, in other embodiments, the HVAC unit 12 may include one heat exchanger or more than two heat exchangers.

The heat exchanger 30 is located within a compartment 31 that separates the heat exchanger 30 from the heat exchanger 28. Fans 32 draw air from the environment through the heat exchanger 28. Air may be heated and/or cooled as the air flows through the heat exchanger 28 before being released back to the environment surrounding the HVAC unit 12. A blower assembly 34, powered by a motor 36, draws air through the heat exchanger 30 to heat or cool the air. The heated or cooled air may be directed to the building 10 by the ductwork 14, which may be connected to the HVAC unit 12. Before flowing through the heat exchanger 30, the conditioned air flows through one or more filters 38 that may remove particulates and contaminants from the air. In certain embodiments, the filters 38 may be disposed on the air intake side of the heat exchanger 30 to prevent contaminants from contacting the heat exchanger 30.

The HVAC unit 12 also may include other equipment for implementing the thermal cycle. Compressors 42 increase the pressure and temperature of the refrigerant before the refrigerant enters the heat exchanger 28. The compressors 42 may be any suitable type of compressors, such as scroll compressors, rotary compressors, screw compressors, or reciprocating compressors. In some embodiments, the compressors 42 may include a pair of hermetic direct drive compressors arranged in a dual stage configuration 44. However, in other embodiments, any number of the compressors 42 may be provided to achieve various stages of heating and/or cooling. As may be appreciated, additional equipment and devices may be included in the HVAC unit 12, such as a solid-core filter drier, a drain pan, a disconnect switch, an economizer, pressure switches, phase monitors, and humidity sensors, among other things.

The HVAC unit 12 may receive power through a terminal block 46. For example, a high voltage power source may be connected to the terminal block 46 to power the equipment. The operation of the HVAC unit 12 may be governed or regulated by a control board 48. The control board 48 may include control circuitry connected to a thermostat, sensors, and alarms. One or more of these components may be referred to herein separately or collectively as the control device 16. The control circuitry may be configured to control operation of the equipment, provide alarms, and monitor safety switches. Wiring 49 may connect the control board 48 and the terminal block 46 to the equipment of the HVAC unit 12.

Figure 3:
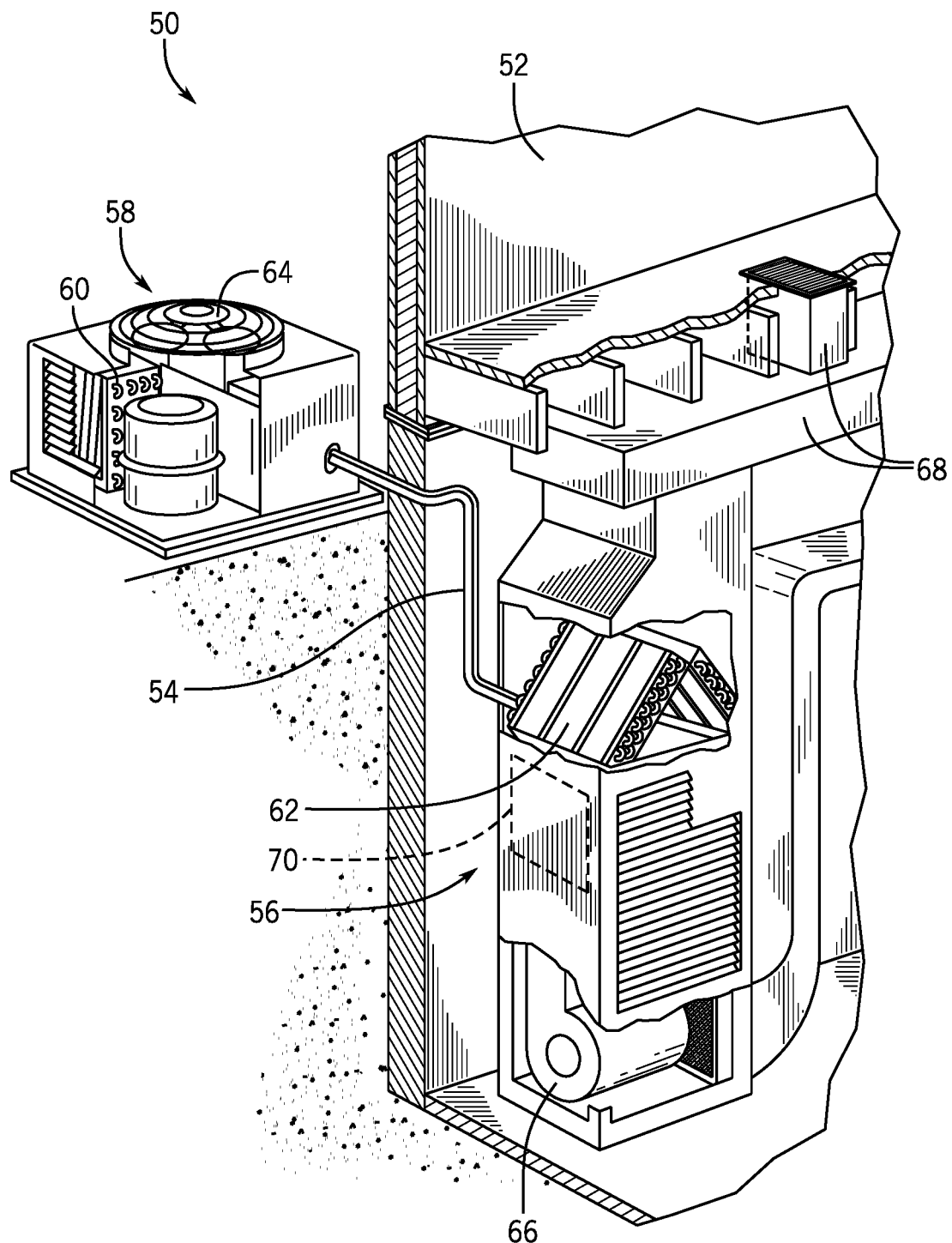
FIG. 3 is a cutaway perspective view of an embodiment of a residential, split HVAC system, in accordance with an aspect of the present disclosure.

FIG. 3 illustrates a residential heating and cooling system 50, also in accordance with present techniques. The residential heating and cooling system 50 may provide heated and cooled air to a residential structure, as well as provide outside air for ventilation and provide improved indoor air quality (IAQ) through devices such as ultraviolet lights and air filters. In the illustrated embodiment, the residential heating and cooling system 50 is a split HVAC system. In general, a residence 52 conditioned by a split HVAC system may include refrigerant conduits 54 that operatively couple the indoor unit 56 to the outdoor unit 58. The indoor unit 56 may be positioned in a utility room, an attic, a basement, and so forth. The outdoor unit 58 is typically situated adjacent to a side of residence 52 and is covered by a shroud to protect the system components and to prevent leaves and other debris or contaminants from entering the unit. The refrigerant conduits 54 transfer refrigerant between the indoor unit 56 and the outdoor unit 58, typically transferring primarily liquid refrigerant in one direction and primarily vaporized refrigerant in an opposite direction.

When the system shown in FIG. 3 is operating as an air conditioner, a heat exchanger 60 in the outdoor unit 58 serves as a condenser for re-condensing vaporized refrigerant flowing from the indoor unit 56 to the outdoor unit 58 via one of the refrigerant conduits 54. In these applications, a heat exchanger 62 of the indoor unit functions as an evaporator. Specifically, the heat exchanger 62 receives liquid refrigerant, which may be expanded by an expansion device, and evaporates the refrigerant before returning it to the outdoor unit 58.

The outdoor unit 58 draws environmental air through the heat exchanger 60 using a fan 64 and expels the air above the outdoor unit 58. When operating as an air conditioner, the air is heated by the heat exchanger 60 within the outdoor unit 58 and exits the unit at a temperature higher than it entered. The indoor unit 56 includes a blower or fan 66 that directs air through or across the indoor heat exchanger 62, where the air is cooled when the system is operating in air conditioning mode. Thereafter, the air is passed through ductwork 68 that directs the air to the residence 52. The overall system operates to maintain a desired temperature as set by a system controller. When the temperature sensed inside the residence 52 is higher than the set point on the thermostat, or the set point plus a small amount, the residential heating and cooling system 50 may become operative to refrigerate additional air for circulation through the residence 52. When the temperature reaches the set point, or the set point minus a small amount, the residential heating and cooling system 50 may stop the refrigeration cycle temporarily.

The residential heating and cooling system 50 may also operate as a heat pump. When operating as a heat pump, the roles of heat exchangers 60 and 62 are reversed. That is, the heat exchanger 60 of the outdoor unit 58 will serve as an evaporator to evaporate refrigerant and thereby cool air entering the outdoor unit 58 as the air passes over the outdoor heat exchanger 60. The indoor heat exchanger 62 will receive a stream of air blown over it and will heat the air by condensing the refrigerant.

In some embodiments, the indoor unit 56 may include a furnace system 70. For example, the indoor unit 56 may include the furnace system 70 when the residential heating and cooling system 50 is not configured to operate as a heat pump. The furnace system 70 may include a burner assembly and heat exchanger, among other components, inside the indoor unit 56. Fuel is provided to the burner assembly of the furnace 70 where it is mixed with air and combusted to form combustion products. The combustion products may pass through tubes or piping in a heat exchanger, separate from heat exchanger 62, such that air directed by the blower 66 passes over the tubes or pipes and extracts heat from the combustion products. The heated air may then be routed from the furnace system 70 to the ductwork 68 for heating the residence 52.

Figure 4:
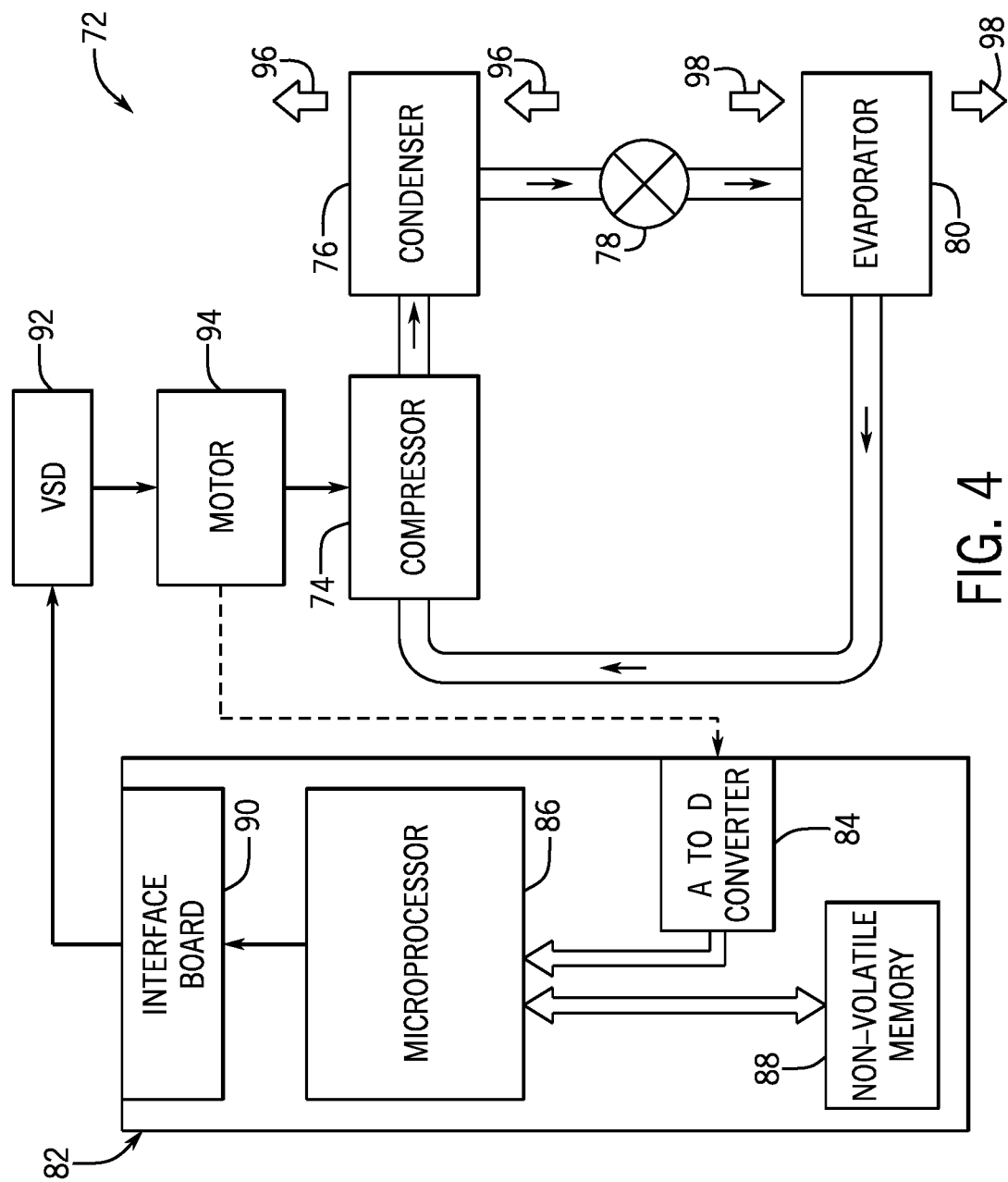
FIG. 4 is a schematic of an embodiment of a vapor compression system that can be used in any of the systems of FIGS. 1-3, in accordance with an aspect of the present disclosure.

FIG. 4 is an embodiment of a vapor compression system 72 that can be used in any of the systems described above. The vapor compression system 72 may circulate a refrigerant through a circuit starting with a compressor 74. The circuit may also include a condenser 76, an expansion valve(s) or device(s) 78, and an evaporator 80. The vapor compression system 72 may further include a control panel 82 that has an analog to digital (A/D) converter 84, a microprocessor 86, a non-volatile memory 88, and/or an interface board 90. The control panel 82 and its components may function to regulate operation of the vapor compression system 72 based on feedback from an operator, from sensors of the vapor compression system 72 that detect operating conditions, and so forth.

In some embodiments, the vapor compression system 72 may use one or more of a variable speed drive (VSDs) 92, a motor 94, the compressor 74, the condenser 76, the expansion valve or device 78, and/or the evaporator 80. The motor 94 may drive the compressor 74 and may be powered by the variable speed drive (VSD) 92. The VSD 92 receives alternating current (AC) power having a particular fixed line voltage and fixed line frequency from an AC power source, and provides power having a variable voltage and frequency to the motor 94. In other embodiments, the motor 94 may be powered directly from an AC or direct current (DC) power source. The motor 94 may include any type of electric motor that can be powered by a VSD or directly from an AC or DC power source, such as a switched reluctance motor, an induction motor, an electronically commutated permanent magnet motor, or another suitable motor.

The compressor 74 compresses a refrigerant vapor and delivers the vapor to the condenser 76 through a discharge passage. In some embodiments, the compressor 74 may be a centrifugal compressor. The refrigerant vapor delivered by the compressor 74 to the condenser 76 may transfer heat to a fluid passing across the condenser 76, such as ambient or environmental air 96. The refrigerant vapor may condense to a refrigerant liquid in the condenser 76 as a result of thermal heat transfer with the environmental air 96. The liquid refrigerant from the condenser 76 may flow through the expansion device 78 to the evaporator 80.

The liquid refrigerant delivered to the evaporator 80 may absorb heat from another air stream, such as a supply air stream 98 provided to the building 10 or the residence 52. For example, the supply air stream 98 may include ambient or environmental air, return air from a building, or a combination of the two. The liquid refrigerant in the evaporator 80 may undergo a phase change from the liquid refrigerant to a refrigerant vapor. In this manner, the evaporator 80 may reduce the temperature of the supply air stream 98 via thermal heat transfer with the refrigerant. Thereafter, the vapor refrigerant exits the evaporator 80 and returns to the compressor 74 by a suction line to complete the cycle.

In some embodiments, the vapor compression system 72 may further include a reheat coil in addition to the evaporator 80. For example, the reheat coil may be positioned downstream of the evaporator relative to the supply air stream 98 and may reheat the supply air stream 98 when the supply air stream 98 is overcooled to remove humidity from the supply air stream 98 before the supply air stream 98 is directed to the building 10 or the residence 52.

It should be noted that any of the features described herein may be incorporated with the HVAC unit 12, the residential heating and cooling system 50, or other HVAC systems. Additionally, while the features disclosed herein are described in the context of embodiments that directly heat and cool a supply air stream provided to a building or other load, embodiments of the present disclosure may be applicable to other HVAC systems as well. For example, the features described herein may be applied to mechanical cooling systems, free cooling systems, chiller systems, or other heat pump or refrigeration applications.

An HVAC system, such as the HVAC unit 12 and/or the residential heating and cooling system 50, may include sensors configured to detect an operating parameter of the HVAC system. In accordance with present techniques, the HVAC system may include a sensor mounting assembly, also referred to herein as a sensor mount, to which the sensors may be coupled. Indeed, embodiments of the present disclosure provide for a sensor mounting assembly configured to support and couple multiple sensors to an HVAC system. For example, the sensor mounting assembly may include a first plate configured to couple to an exterior of the HVAC system, such as at an opening of a housing of the HVAC system. The sensor mounting assembly may also include a second plate that couples to the first plate and is configured to extend through the opening into the HVAC system. Each sensor of a plurality of sensors may couple to the second plate of the sensor mounting assembly. Thus, each sensor may be positioned within the HVAC system, such as within an interior of a housing, when the sensor mounting assembly is coupled to the HVAC system. The first plate of the sensor mounting assembly may remain exposed and/or visible from the exterior of the HVAC system, which may enable the sensors to be located more easily. Moreover, the first plate may be decoupled from the HVAC system without accessing the interior of the HVAC system, which may enable easier and improved access to each of the sensors. In this manner, the sensor mounting assembly may increase accessibility of the sensors of the HVAC system, such as during installation and/or replacement of the sensors.

Figure 5:
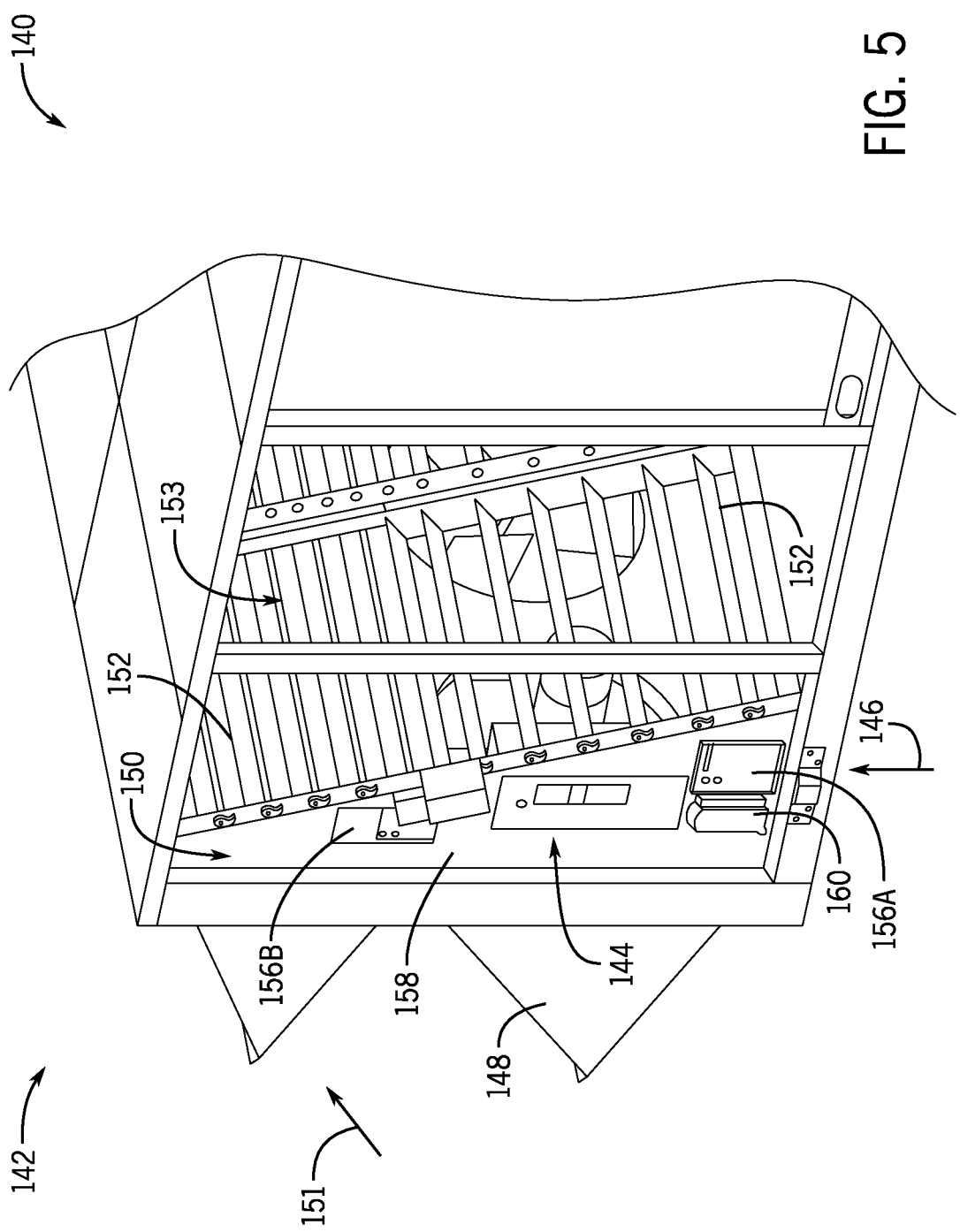
FIG. 5 is a perspective partial view of an embodiment of an HVAC system including a sensor mounting assembly, in accordance with an aspect of the present disclosure.

FIG. 5 is a perspective partial view of an embodiment of an HVAC system 140 configured to circulate an air flow. For example, the HVAC system 140 may include a housing 142 configured to receive and/or deliver an air flow from and/or to a conditioned space, such as a space within the building 10. The housing 142 may include a first section 144 configured to receive a first air flow 146, such as return air from a structure serviced by the HVAC system 140. The first air flow 146 may be directed through remaining sections of the housing 142, as discussed below, or the first air flow 146 may be discharged from the housing 142 via an exhaust outlet 148.

The housing 142 may also include a second section 150 configured to receive a second air flow 151, such as an outdoor air from an ambient environment surrounding the HVAC system 140. The respective air flows 146, 151 received by the first section 144 and the second section 150 may each be selectively directed, such as via actuation of dampers 152, to a third section 153 of the housing 142. For example, a return air flow received by the first section 144 and an outdoor air flow received by the second section 150 may be directed into the third section 153 where the air flows may be mixed and subsequently directed elsewhere through the housing 142 for further conditioning. Thereafter, the mixed, conditioned air flow may be discharged as conditioned supply air to the structure serviced by the HVAC system 140. The housing 142 may include a divider or barrier that fluidly separates the first section 144 and the second section 150 to block the first air flow 146 from mixing with the second air flow 151 upstream of the dampers 152 and the third section 153. However, for purposes of discussion and visualization of the housing 142, the barrier is not illustrated in FIG. 5.

The HVAC system 140 may include one or more sensor mounting assemblies 156 having one or more sensors configured to detect or determine a condition of one of the air flows circulating in the HVAC system 140. In some embodiments, the HVAC system 140 may include a first sensor mounting assembly 156A having a sensor configured to determine a property or condition of the first air flow 146 directed into the housing 142 and a second sensor mounting assembly 156B having a sensor configured to determine a property or condition of the second air flow 151 entering the housing 142. In some embodiments, each sensor mounting assembly 156 may include multiple sensors that are each configured to measure a different property or condition of one of the air flows directed through the housing 142.

The first sensor mounting assembly 156A may be positioned adjacent to the first section 144 where the first air flow 146 enters the housing 142, and the second sensor mounting assembly 156B may be positioned adjacent to the second section 150 where the second air flow 151 enters the housing 142. Each sensor mounting assembly 156 may be coupled to a panel 158 or other structural portion of the housing 142 and may extend into the housing 142 to be exposed to the air flows directed through the housing 142. Although FIG. 5 illustrates the HVAC system 140 as including two sensor mounting assemblies 156, other embodiments of the HVAC system 140 may include any number of sensor mounting assemblies 156, such as one sensor mounting assembly 156, or more than two sensor mounting assemblies 156.

As mentioned above, one or more sensors may be coupled to each sensor mounting assembly 156. As an example, the one or more sensors may include a temperature sensor configured to determine a temperature of an air flow, a humidity sensor configured to determine a composition of liquid in an air flow, a $CO_2$ sensor configured to determine a composition of $CO_2$ in an air flow, another type of sensor, or any combination thereof. In some implementations, the types of sensors coupled to the sensor mounting assembly 156 may depend on the location of the sensor mounting assembly 156 and/or the air flow to be monitored by the sensors of the sensor mounting assembly 156. For instance, an embodiment of the first sensor mounting assembly 156A configured to be placed adjacent to the first air flow 146 may include a smoke sensor configured to detect a presence or amount of smoke in a return air flow received from a conditioned space by the HVAC system 140. As another example, an embodiment of the second sensor mounting assembly 156B configured to be placed adjacent to the second air flow 151, which may be an outdoor air flow, may not include a smoke sensor.

The HVAC system 140 may further include one or more controllers 160. As shown in FIG. 5, one of the controllers 160 may be coupled to an exterior of the housing 142, such as adjacent to the first sensor mounting assembly 156A on the panel 158 of the housing 142. The controller 160 may be configured to control operations of the HVAC system 140, such as adjusting a flow rate of air directed through the housing 142. Sensors of the HVAC system 140, including sensors coupled to the sensor mounting assemblies 156, may be communicatively coupled to one of the controllers 160 to enable the controller 160 to receive feedback indicative of the properties or conditions of the air flows, as determined by the sensors. The controller 160 may then control the operation of the HVAC system 140 based on the feedback. In certain embodiments, sensors may be wirelessly coupled to one of the controllers 160. In additional or alternative embodiments, sensors may be communicatively coupled to one of the controllers 160 via a hard electrical connection, such as a wire. As will be further described herein, the sensor mounting assemblies 156 may enable physical electrical connections between the controller 160 and the sensors to be routed from within the housing 142 to outside of the housing 142 where the controller 160 may be located.

Figure 6:
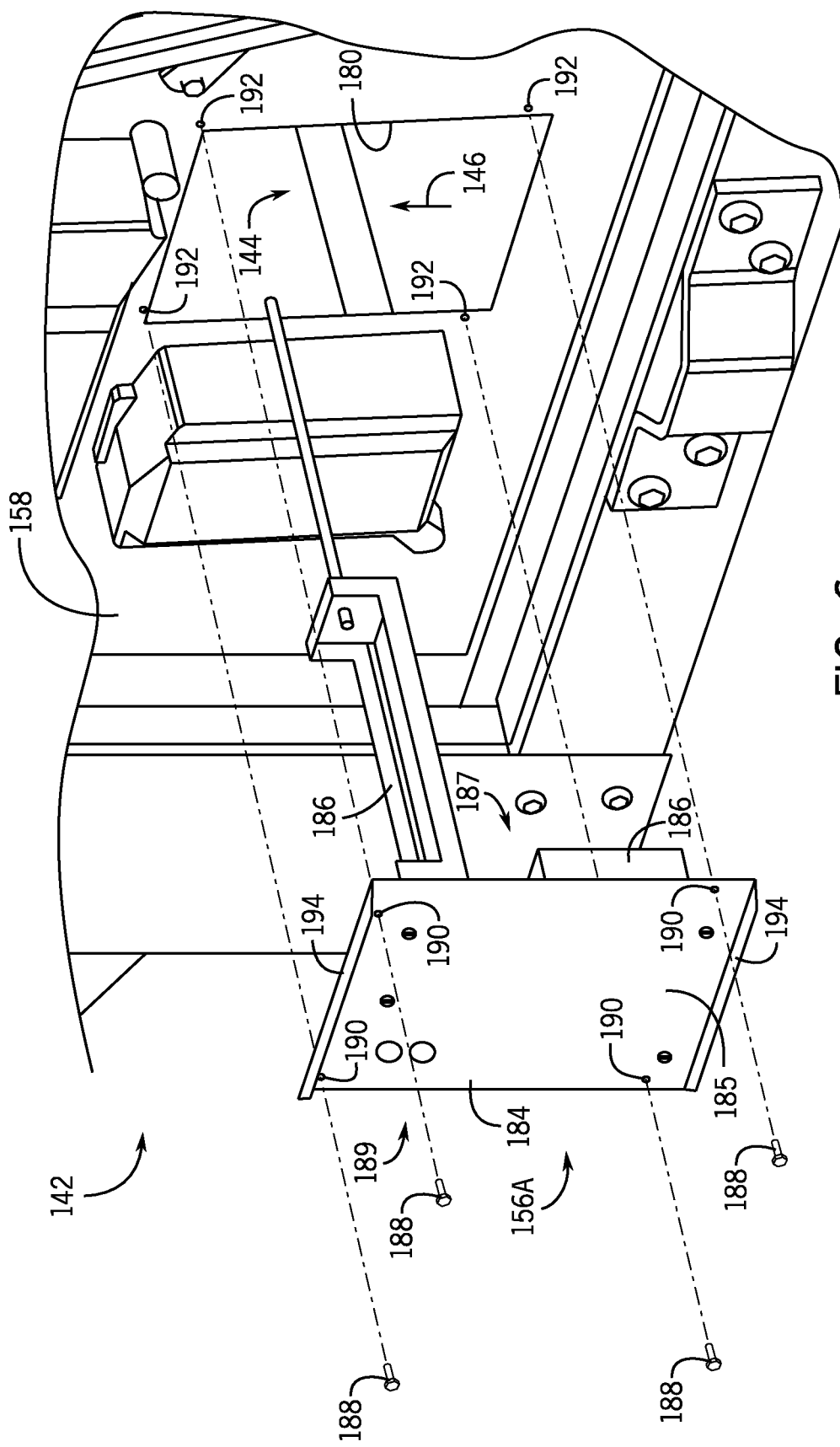
FIG. 6 is a perspective exploded view of an embodiment of a sensor mounting assembly configured to couple to a housing of an HVAC system, in accordance with an aspect of the present disclosure.

FIG. 6 is an exploded perspective view of an embodiment of the HVAC system 140, illustrating the sensor mounting assembly 156 detached from the housing 142. In the illustrated embodiment, the panel 158 of the housing 142 has an opening 180 formed therein. The opening 180 enables access into the first section 144 of the housing 142 that receives the first air flow 146. The sensor mounting assembly 156A includes a cover 184 configured to couple to the panel 158 where the opening 180 is located. Although the cover 184 is illustrated as a plate in FIG. 6, it should be noted that in additional or alternative embodiments, the cover 184 may be a component having a different geometric shape, such as a dome, a box, and the like. When the sensor mounting assembly 156A is coupled to the panel 158, the cover 184 may block or occlude the opening 180. Moreover, the sensor mounting assembly 156A includes sensors 186 disposed on a first side 187, such as an internal side, of the cover 184. The sensors 186 may extend through the opening 180 and into the housing 142 when the cover 184 is coupled to the panel 158 in an installed configuration of the sensor mounting assembly 156A. As such, in the installed configuration of the sensor mounting assembly 156A, the sensors 186 may detect properties of the first air flow 146 directed into the first section 144 of the housing 142.

In some embodiments, access to an interior of the housing 142 may be limited. As such, the cover 184 may be configured to couple to the panel 158 from exterior to the housing 142, such as to an exterior surface of the panel 158. The cover 184 may use first fasteners 188 that may fasten the cover 184 to the panel 158 without having to access the interior of the housing 142. That is, the first fasteners 188 may extend through the cover 184 from a second side 189, such as an external side, of the cover 184. As an example, the first fasteners 188 may include removable fasteners, such as self-tapping screws, self-locking screws, rivets, another suitable fastener, or any combination thereof, that may removably couple the cover 184 to the panel 158 without a user or operator accessing the interior of the housing 142. Each first fastener 188 may be inserted through a respective first cover hole 190 formed in the cover 184 and through a respective panel hole 192 formed in the panel 158. In this way, the first fasteners 188 may fasten the cover 184 to the panel 158 to couple the sensor mounting assembly 156A to the housing 142. Although FIG. 6 illustrates the use of four first fasteners 188 positioned at corners of the cover 184 to couple the cover 184 to the panel 158, any suitable number of first fasteners 188 may be positioned in any suitable orientation on the cover 184 to couple the cover 184 to the panel 158. The cover 184 may further include lips 194 that extend crosswise and away from a base or mounting portion 185 of the cover 184. The lips 194 may facilitate installation and/or removal of the cover 184 with respect to the panel 158. For example, the lips 194 may enable a user to grip the cover 184 to align the cover 184 and the sensor mounting assembly 156A with the opening 180 of the panel 182 during installation. In the illustrated embodiment, the sensor mounting assembly 156A includes two lips 194 extending from opposite ends of the cover 184, but in additional or alternative embodiments, the sensor mounting assembly 156A may include any suitable number of lips 194 extending from the cover 184.

Figure 7:
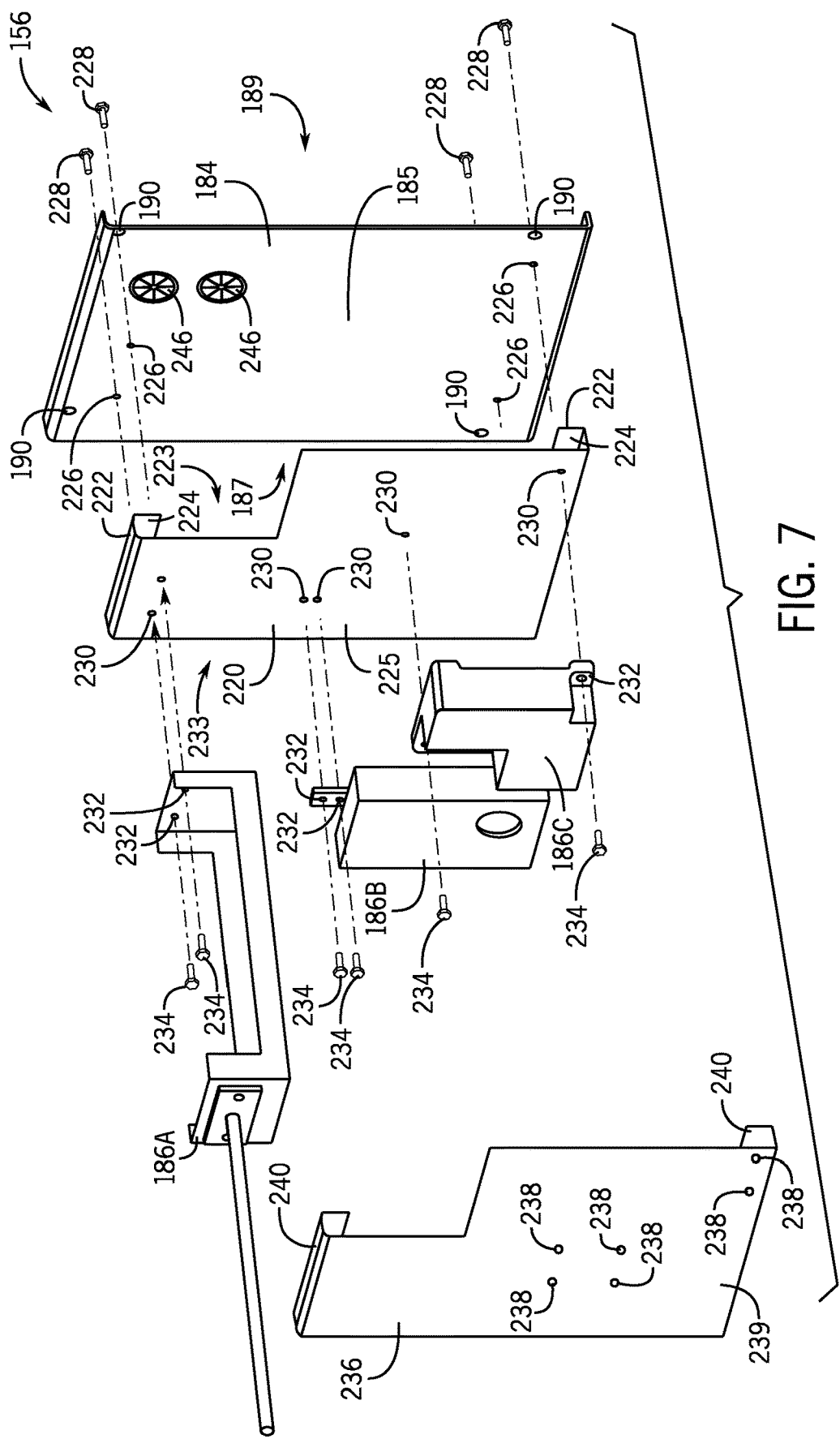
FIG. 7 is an exploded perspective view of an embodiment of a sensor mounting assembly that may be coupled to a housing of an HVAC system, in accordance with an aspect of the present disclosure.

FIG. 7 is an exploded perspective view of an embodiment of the sensor mounting assembly 156 that may be coupled to the panel 158 of the housing 142. As illustrated in FIG. 7, the sensor mounting assembly 156 includes the cover 184, along with a sensor support 220 configured to couple to the cover 184. The sensor support 220 may be a plate, a dome, a box, a component of another geometry shape, or any combination thereof. In some embodiments, the sensor support 220 may include flanges 222 that extend from a first or cover facing side 223 of the sensor support 220. The flanges 222 are configured to abut the cover 184 in an assembled configuration of the sensor mounting assembly 156. Each flange 222 may be U-shaped to define a respective channel 224, and the flanges 222 may offset a body or sensor mounting portion 225 the sensor support 220 from the cover 184 by a space, which will be further described herein. The cover 184 may have a plurality of second cover holes 226 that each align with one of the flanges 222. A second fastener 228 may be inserted through each respective second cover hole 226 of the cover 184 from the second side 189. The second fasteners 228 may also extend through the flanges 222 of the sensor support 220 to couple the cover 184 to the sensor support 220.

The sensor support 220 may also have a plurality of sensor support holes 230. The sensor support holes 230 may be used to couple the sensors 186 to the sensor support 220. For example, each sensor 186 may include one or more sensor mounting holes 232 that align with a respective sensor support hole 230 of the sensor support 220. In other words, the sensor mounting holes 232 of a particular sensor 186 may align with a specific orientation or set of the sensor support holes 230 to enable coupling of the sensor 186 to the sensor support 220 on a second or sensor facing side 233 of the sensor support 220. Alternative embodiments of the sensor support 220 may have sensor mounting holes 232 positioned in a different orientation than that shown in FIG. 7, such as to enable additional or alternative sensors 186 to couple to the sensor support 220. Third fasteners 234 may be inserted through each respective sensor mounting holes 232 and then through one of the sensor support holes 230 to couple each sensor 186 to the sensor support 220.

As mentioned, different sensors 186 may be coupled to different sensor mounting assemblies 156. In some embodiments, the cover 184 of each sensor mounting assembly 156 may have a common or similar configuration, such that the cover 184 of each sensor mounting assembly 156 may align with the opening 180 and couple to the panel 158. However, each cover 184 may be configured to couple to different embodiments of the sensor support 220, and a different set of sensors 186 may couple to different embodiments of the sensor support 220.

For example, an additional sensor support 236 may be configured to couple to the cover 184 separately from the sensor support 220. The additional sensor support 236 may include additional sensor support holes 238 that enable other sensors 186 to couple to the additional sensor support 236. The additional sensor support holes 238 may be positioned in a different orientation on an additional body 239 of the additional sensor support 236 than the sensor support holes 230 are positioned on the sensor support 220. In the illustrated embodiment, the orientation of the sensor support holes 230 of the sensor support 220 may a temperature sensor 186A, a $CO_2$ sensor 186B, and/or a humidity sensor 186C to couple to the sensor support 220. However, the orientation of the additional sensor support holes 238 of the additional sensor support 236 may enable other types and/or configurations of sensors 186, such as a smoke sensor, to couple to the additional sensor support 236.

Both the sensor support 220 and the additional sensor support 236 may be configured to couple to the second cover holes 226, such as via the flanges 222 of the sensor support 220 or additional flanges 240 of the additional sensor support 236. In other words, the second cover holes 226 of each cover 184 may have the same orientation, and both the sensor support 220 and the additional sensor support 236 may be configured to align with the second cover holes 226 of different covers 184. However, the sensor support holes 230, the additional sensor support holes 238, and other sensor support holes may be oriented differently than one another to enable a different set or combination of sensors 186 to align with the respective sensor support holes and couple to the respective sensor supports. In this manner, if a different set of sensors 186 are to be installed with the HVAC system 140 having an embodiment of the sensor mounting assembly 156, the corresponding sensor support may be replaced without replacing the cover 184.

The cover 184 may further include one or more grommets 246 that enable electrical connections of the sensors 186 to pass through the cover 184. For example, the grommets 246 may enable wires, cables, or other physical electrical connections to route from the first side 187 of the cover 184 to the second side 189 of the cover 184, such as to connect with the controller 160 that may be located external to the panel 158 and/or the housing 142. Although the illustrated sensor mounting assembly 156 has two grommets 246 disposed at particular positions on the cover 184, additional or alternative embodiments of the sensor mounting assembly 156 may have any suitable number of grommets 246 positioned at any suitable orientation. In further embodiments, the sensor support 220 may also include grommets 246 that enable physical electrical connections of the sensors 186 to pass through the sensor support 220.

Figure 8:
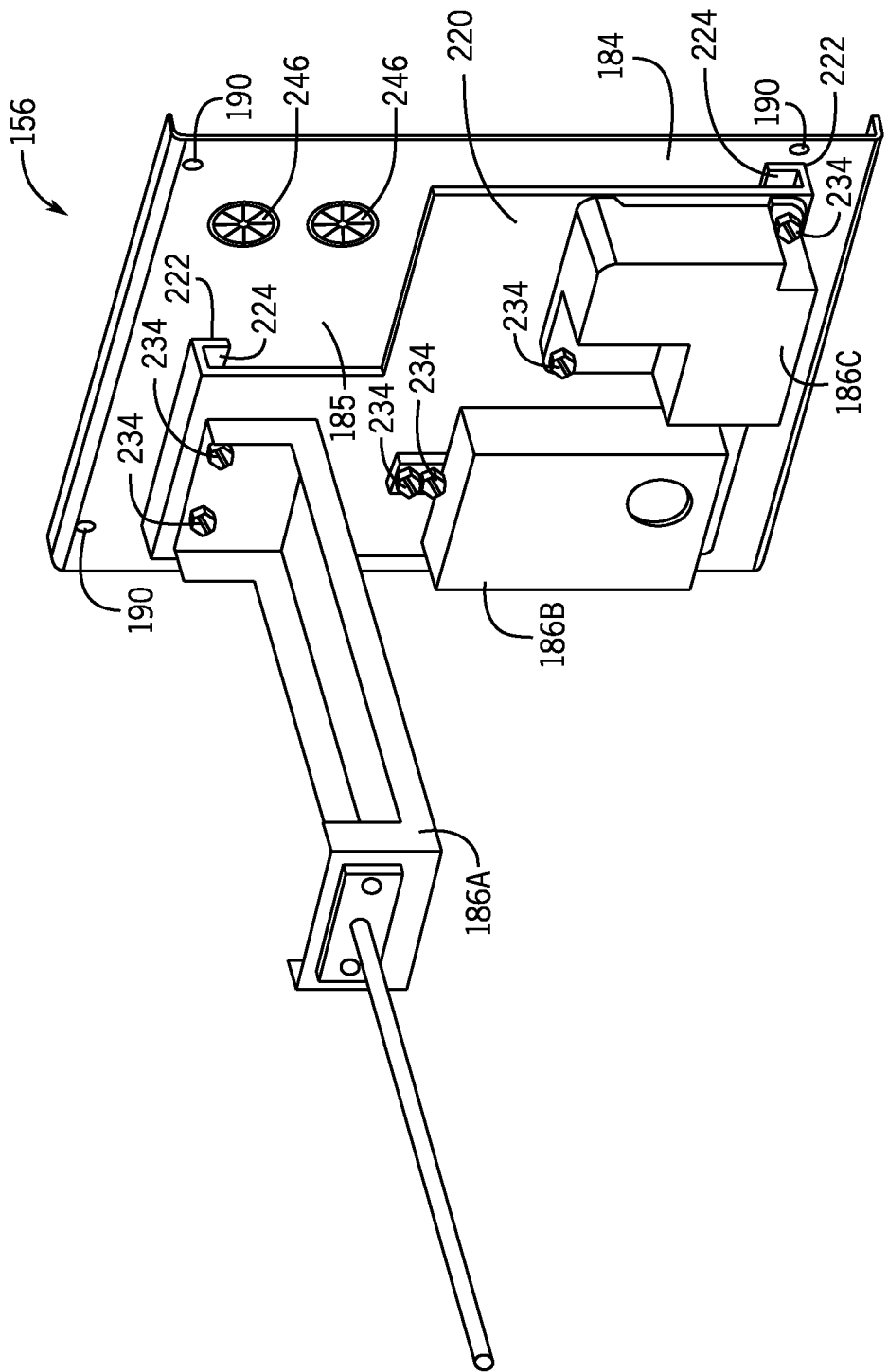
FIG. 8 is a perspective view of an embodiment of a sensor mounting assembly in an assembled configuration, in accordance with an aspect of the present disclosure.

FIG. 8 is a perspective view of an embodiment of the sensor mounting assembly 156 in the assembled configuration. In the assembled configuration, the sensors 186 are each coupled to the sensor support 220 via the third fasteners 234, and the sensor support 220 is coupled to the cover 184 via the second fasteners 228, which are blocked from view in FIG. 8. Additionally, the grommets 246 are each attached to the cover 184. As shown in FIG. 8, the sensor support 220 and the sensors 186 are each offset from the cover 184, which may enable the second and third fasteners 228, 234 to terminate in a space formed between the sensor support 220 and the cover 184, as will be further described herein.

Figure 9:
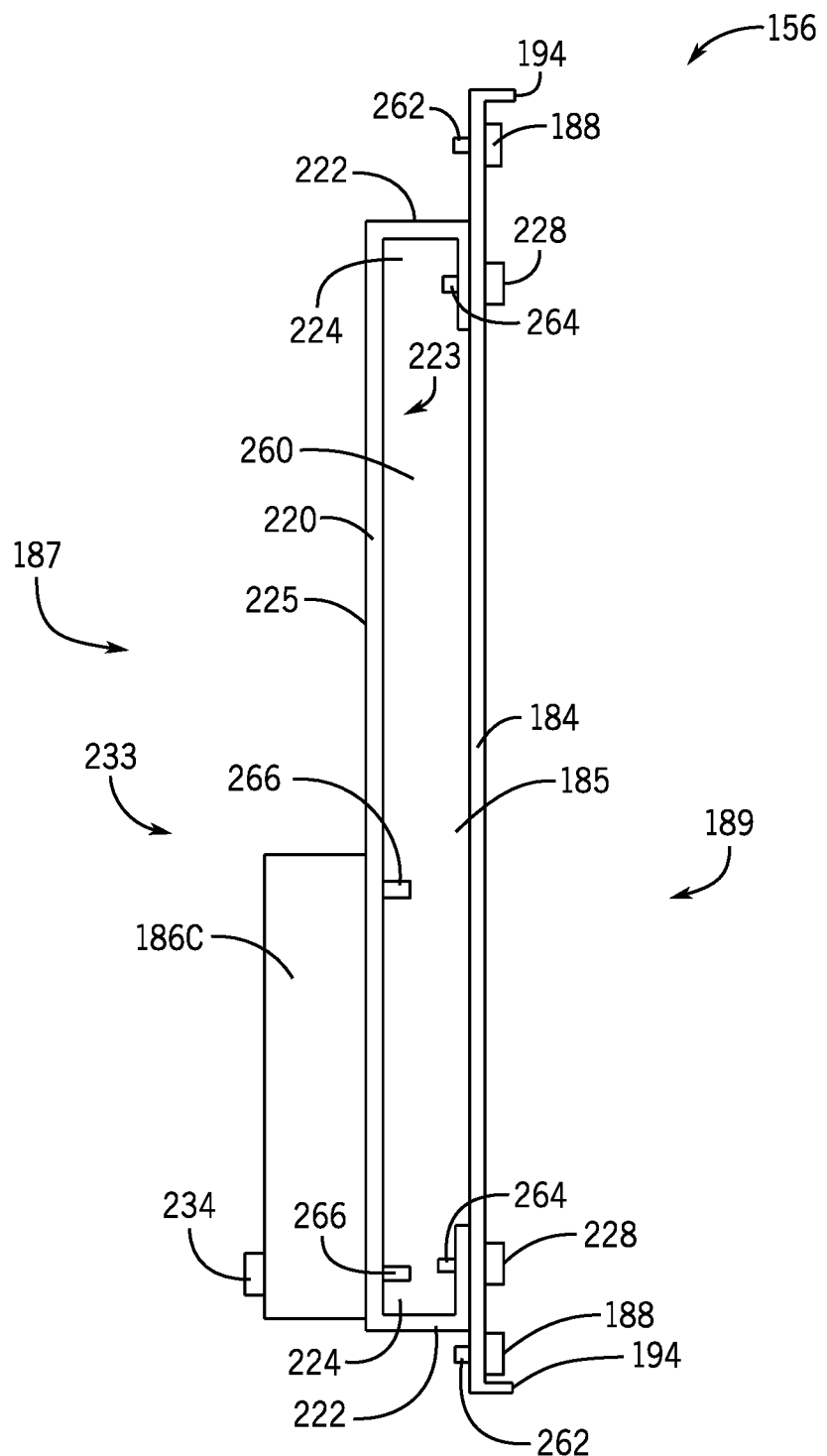
FIG. 9 is a side view of an embodiment of a sensor mounting assembly in an assembled configuration, in accordance with an aspect of the present disclosure.

FIG. 9 is a side view of an embodiment of the sensor mounting assembly 156 in the assembled configuration. To focus on the components of the sensor mounting assembly 156 disposed between the sensor support 220 and the cover 184, the temperature sensor 186A, the $CO_2$ sensor 186B, and the grommets 246 previously discussed above are not shown in FIG. 9. As illustrated in FIG. 9, the flanges 222 of the sensor support 220 abut against the cover 184 to offset the sensor support 220 from the cover 184. As such, a space 260 is formed between the body 225 of the sensor support 220 and the cover 184. A size of the space 260 may be based on a dimension of the flange 222 and/or on the channel 224 defined by the flange 222. In some implementations, different embodiments of the sensor support 220 may have differently-sized flanges 222 and/or channels 224. Thus, different embodiments of the sensor support 220 may offset the body 225 of the sensor support 220 from the cover 184 by a differently-sized space 260. That is, for example, the additional flanges 240 of the additional sensor support 236 may offset the additional body 239 of the additional sensor support 236 from the cover 184 by a different amount than the flanges 222 of the sensor support 220 offsets the body 225 of the sensor support 220 from the cover 184. Thus, the space 260 formed between the additional body 239 of the additional sensor support 236 and the cover 184 may be differently-sized than the space 260 formed between the body 225 of the sensor support 220 and the cover 184.

The first fasteners 188 may extend from the second side 189 of the cover 184 to the first side 187 of the cover 184 in order to couple the cover 184 and the sensor mounting assembly 156 to the panel 158 of the housing 142. Each first distal end 262 of the respective first fasteners 188 may extend through the cover 184 and may extend through one of the panel holes 192 of the panel 158 but may not extend into the channel 224 or the space 260. In the illustrated embodiment, each first fastener 188 is positioned adjacent to one of the lips 194, but in additional or alternative embodiments, the first fasteners 188 may be positioned in another suitable location on the cover 184 to couple the sensor mounting assembly 156 to the panel 158.

The second fasteners 228 may also extend from the second side 189 of the cover 184 to the first side 187 of the cover 184. Each second distal end 264 of the respective second fasteners 228 may extend and terminate within one of the channels 224 and/or the space 260. As an example, second fasteners 228 having a particular length may be selected such that the second distal end 264 of each respective second fastener 228 extends and terminates within one of the channels 224 and terminates before abutting the sensor support 220. Thus, the body 225 of the sensor support 220, to which the sensors 186 are coupled, is unaffected by the second fasteners 228, and the second distal ends 264 are contained within the space 260 and/or the channels 224 to block interference between the second distal ends 264 and other components or operators of the HVAC system 140.

Furthermore, the third fasteners 234 may extend from the sensor facing side 233 to the cover facing side 223 of the sensor support 220. Each third distal end 266 of the third fasteners 234 may also extend into and terminate within one of the channels 224 and/or the space 260. That is, third fasteners 234 having a particular length may be selected, such that the third distal end 266 of each respective third fastener 234 extends into one of the channels 224 or into the space 260 and terminates before abutting the cover 184. As such, the cover 184 is unaffected by the third fasteners 234, and the third distal ends 266 are contained within the space 260 and/or the channels 224 to avoid interference between the third distal ends 266 and other components or operators of the HVAC system 140 in the assembled configuration of the sensor mounting assembly 156.

The flanges 222 may be sized to enable each channel 224 to accommodate both the second distal ends 264 and the third distal ends 266. That is, a second distal end 264 of one of the second fasteners 228 may extend into one of the channels 224, and a third distal end 266 of one of the third fasteners 234 may also extend into the same channel 224. However, the channel 224 may be large enough such that the second distal end 264 does not interfere with or come into contact with the third distal end 266, and/or the arrangement of the second fastener 228 and third fasteners 234 may be selected to avoid interference therebetween. As a result, the sensor support holes 230 and the second cover holes 226 may each be positioned in any orientation while still avoiding contact between the second fasteners 228 and the third fasteners 234 in the installed configuration of the sensor mounting assembly 156.

Figure 10:
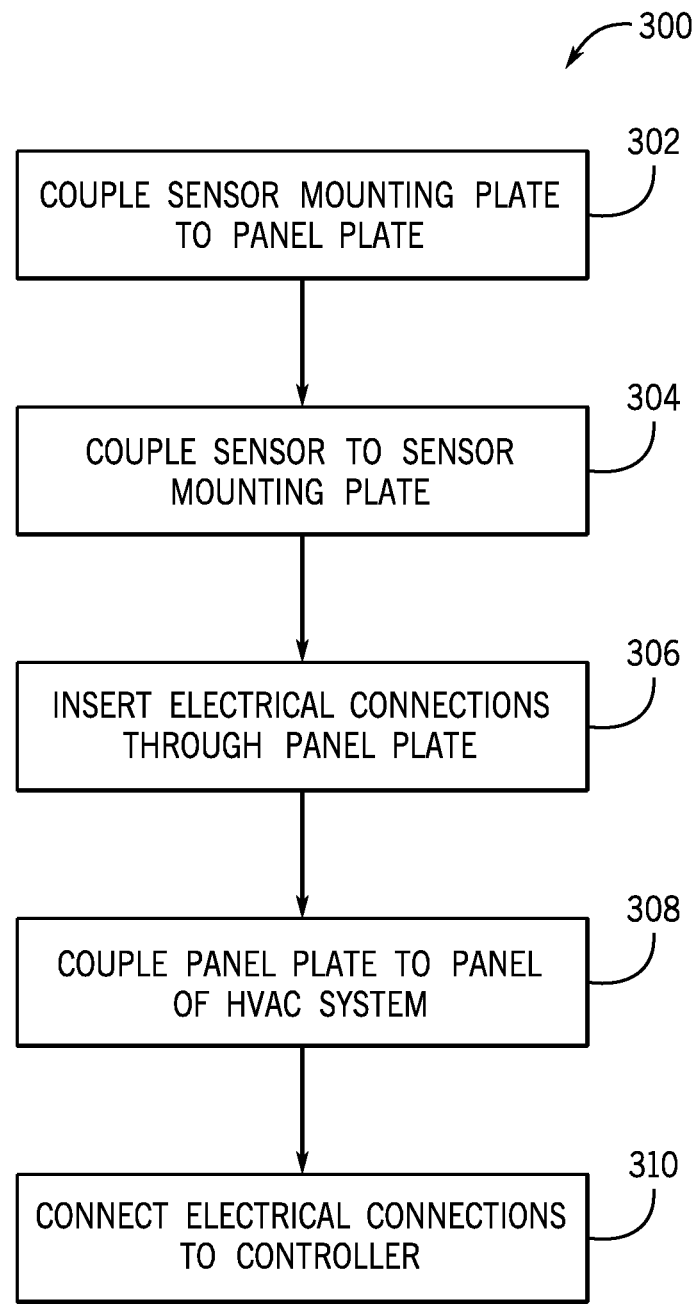
FIG. 10 is a flowchart of an embodiment of a method or process for assembling a sensor mounting assembly and installing the sensor mounting assembly onto a housing of an HVAC system, in accordance with an aspect of the present disclosure.

FIG. 10 is a flowchart of an embodiment of a method or process 300 for assembling the sensor mounting assembly 156 and installing the assembled sensor mounting assembly 156 onto the HVAC system 140. The method 300 may be performed by a user, such as a manufacturer, technician, mechanic, or any other suitable user or operator. It should be noted that different methods may be used to assemble and install the sensor mounting assembly 156, such as for different configurations of the sensor mounting assembly 156. For example, other steps may be performed in addition to the method 300, or certain steps of the depicted method 300 may be modified, removed, or performed in a different order than shown in the illustrated embodiment of FIG. 10.

At block 302, the sensor support 220 is coupled to the cover 184. For instance, a user may position the sensor support 220 adjacent to the cover 184 and may align the flanges 222 with the second cover holes 226. In some embodiments, the flanges 222 may include mounting holes that align with the second cover holes 226. The second fasteners 228 are then inserted through the second cover holes 226 and into the flanges 222 to fasten the sensor support 220 and the cover 184 to one another.

At block 304, each sensor 186 is coupled to the sensor support 220. That is, sensor mounting holes 232 of the respective sensors 186 are aligned with the sensor support holes 230 of the sensor support 220. Thereafter, third fasteners 234 are inserted into each respectively aligned sensor mounting holes 232 and sensor support hole 230 to fasten each sensor 186 to the sensor support 220.

After mounting each sensor 186 to the sensor support 220, physical electrical connections of the sensors 186 may be routed through the cover 184, as indicated at block 306. By way of example, each physical electrical connection may be routed through one of the grommets 246. Thus, the electrical connections extend from the first side 187 of the cover 184 to the second side 189 of the cover 184. After the steps of blocks 302 to 306 have been completed, the sensor mounting assembly 156 may be considered to be in the assembled configuration.

At block 308, the cover 184 is coupled to the panel 158. For example, the sensor mounting assembly 156 may be positioned adjacent to the panel 158, such that the sensors 186 extend through the opening 180 of the panel 158, and each first cover hole 190 of the cover 184 is aligned with a respective panel hole 192 of the panel 158. In this way, the cover 184 is positioned over the opening 180 formed in the panel 158. One of the first fasteners 188 may be inserted into each respectively aligned first cover hole 190 and panel hole 192 to fasten the cover 184 to the panel 158, such that the cover 184 is secured to the panel 158 of the housing 142.

At block 310, after the cover 184 is coupled to the panel 158, the electrical connections are coupled to the controller 160. That is, the electrical connections that are routed through the grommet 246 to the second side 189 of the cover 184 may be connected to the controller 160. As such, the sensors 186 may be communicatively coupled to the controller 160 to enable the controller 160 to receive feedback, such as detected properties of an air flow, collected by the sensors 186. After the steps of blocks 308 and 310 have been completed, the sensor mounting assembly 156 may be considered to be in the installed configuration.

The present disclosure may provide one or more technical effects useful in the operation of an HVAC system. For example, the HVAC system may use one or more sensors configured to monitor properties of an air flow directed through the HVAC system. The sensors may be coupled to a sensor mounting assembly configured to mount to a housing of the HVAC system. In some embodiments, the sensor mounting assembly may include a cover and a sensor support. The sensor support may include sensor support holes that are oriented to enable a group or set of sensors to couple to the sensor support. Different embodiments of the sensor support may have sensor support holes oriented differently to enable a different set of sensors to couple to the sensor support. However, each embodiment of the sensor support may be configured to couple to the same embodiment of the cover. Thus, different sensors may be included in the sensor mounting assembly by changing the sensor support without replacing the cover. Moreover, the cover may couple to an exterior of the housing, such as over an opening formed in the housing that enables the sensors of the sensor mounting assembly to extend into an interior of the housing. Thus, the sensors may determine the condition of the air flow directed through the housing while the cover is coupled to the housing. By enabling the cover and the sensor mounting assembly to couple to the exterior of the housing, the sensors of the sensor mounting assembly may be installed onto or removed from the HVAC system without accessing an interior of the housing, which may reduce a time and cost associated with installing, adjusting, and/or replacing the sensor mounting assembly relative to the housing. The technical effects and technical problems in the specification are examples and are not limiting. It should be noted that the embodiments described in the specification may have other technical effects and can solve other technical problems.

While only certain features and embodiments of the disclosure have been illustrated and described, many modifications and changes may occur to those skilled in the art, such as variations in sizes, dimensions, structures, shapes and proportions of the various elements, values of parameters, including temperatures and pressures, mounting arrangements, use of materials, colors, orientations, and so forth without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the disclosure. Furthermore, in an effort to provide a concise description of the exemplary embodiments, all features of an actual implementation may not have been described, such as those unrelated to the presently contemplated best mode of carrying out the disclosure, or those unrelated to enabling the claimed disclosure. It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. A sensor mounting assembly for a heating, ventilation, and/or air conditioning (HVAC) unit, comprising:
    a cover configured to couple to a panel of the HVAC unit and occlude an opening formed in the panel; and
    a sensor support configured to couple to the cover and support a sensor coupled to the sensor support, wherein the sensor support is configured to extend into the HVAC unit, via the opening, in an installed configuration of the sensor mounting assembly, the sensor support is one of a plurality of sensor supports, and the sensor support comprises a first plurality of holes arranged in a first orientation on the sensor support,
    wherein the cover is configured to interchangeably couple to the sensor support and to an additional sensor support of the plurality of sensor supports, and the additional sensor support comprises a second plurality of holes arranged in a second orientation, different from the first orientation, on the additional sensor support.

2. The sensor mounting assembly of claim 1, comprising a fastener configured to couple the cover to the sensor support, wherein the sensor support includes a U-shaped flange defining a channel configured to receive a distal end of the fastener in an assembled configuration of the sensor mounting assembly.

3. The sensor mounting assembly of claim 2, comprising the sensor and an additional fastener configured to couple the sensor to the sensor support, wherein the channel is configured to receive an additional distal end of the additional fastener in the assembled configuration of the sensor mounting assembly.

4. The sensor mounting assembly of claim 2, comprising an additional fastener configured to couple the cover to the panel of the HVAC unit without an additional distal end of the additional fastener extending into the channel in the assembled configuration of the sensor mounting assembly.

5. The sensor mounting assembly of claim 1, wherein the cover includes a grommet configured to receive a wire extending from the sensor to a controller of the HVAC unit.

6. The sensor mounting assembly of claim 1, comprising the sensor, wherein the cover is configured to couple to a first side of the sensor support, and the sensor is configured to couple to a second side of the sensor support opposite the first side.

7. The sensor mounting assembly of claim 1, comprising a plurality of sensors including the sensor, wherein the sensor support is configured to support the plurality of sensors, and the plurality of sensors includes a temperature sensor, a carbon dioxide sensor, a humidity sensor, a smoke sensor, or any combination thereof.

8. The sensor mounting assembly of claim 1, wherein the cover comprises a plate with a lip that extends crosswise away from a mounting portion of the cover.

9. A heating, ventilation, and/or air conditioning (HVAC) unit, comprising:
a housing configured to receive an air flow directed through the HVAC unit, wherein the housing includes a panel and an opening formed in the panel; and
a sensor mounting assembly including a first plate configured to couple to an exterior surface of the panel and occlude the opening, and including a second plate configured to couple to the first plate and extend through the opening into the housing, wherein the second plate is configured to couple to a first sensor,
wherein the first plate is configured to separately couple to the second plate and to a third plate configured to couple to a second sensor, different from the first sensor.

10. The HVAC unit of claim 9, comprising the first sensor and a controller configured to couple to the exterior surface of the panel, wherein the first sensor is configured to communicatively couple to the controller.

11. The HVAC unit of claim 10, wherein the first plate includes a grommet, and the first sensor includes an electrical connection configured to route through the grommet and connect to the controller to communicatively couple the first sensor to the controller.

12. The HVAC unit of claim 9, wherein the second plate includes a flange configured to abut the first plate and form a space between the first plate and a body of the second plate in an assembled configuration of the sensor mounting assembly.

13. The HVAC unit of claim 9, wherein the sensor mounting assembly is a first sensor mounting assembly, the panel includes an additional opening, and the HVAC unit includes a second sensor mounting assembly having fourth plate configured to couple to the panel and occlude the additional opening, wherein the second sensor mounting assembly includes a fifth plate configured to couple to the fourth plate and extend through the additional opening into the HVAC unit, and wherein the fifth plate is configured to couple to a third sensor.

14. The HVAC unit of claim 13, wherein the housing is configured to receive an additional air flow directed through the HVAC unit, the first sensor mounting assembly is configured to position the first sensor within the housing to determine a property of the air flow, and the second sensor mounting assembly is configured to position the third sensor within the housing to determine a property of the additional air flow.

15. The HVAC unit of claim 14, wherein the air flow is a return air flow, and the additional air flow is an outdoor air flow.

16. The HVAC unit of claim 9, wherein the first plate has a first hole configured to receive a first fastener to couple the first plate to the panel and the first plate has a second hole configured to receive a second fastener to couple the second plate to the first plate.

17. The HVAC unit of claim 16, wherein the second plate has a third hole configured to receive a third fastener to couple the first sensor to the second plate.

18. The HVAC unit of claim 17, wherein the first fastener does not extend through the second plate, the second fastener does not extend through a sensor mounting portion of the second plate, and the third fastener does not extend through the first plate.

19. A sensor mounting system for a heating, ventilation, and/or air conditioning (HVAC) unit, comprising:
a cover configured to couple to a panel of the HVAC unit and align with an opening formed in the panel;
a first sensor support configured to couple to the cover and having a first plurality of sensor support holes arranged in a first orientation on the first sensor support; and
a second sensor support configured to couple to the cover and having a second plurality of sensor support holes arranged in a second orientation on the second sensor support, wherein the first sensor support and the second sensor support are configured to separately couple to the cover, and the first orientation and the second orientation are different from one another.

20. The sensor mounting system of claim 19, comprising a sensor having mounting holes, wherein the mounting holes are configured to align with sensor support holes of the first plurality of sensor support holes to couple the sensor to the first sensor support, and wherein the mounting holes are not configured to align with sensor support holes of the second plurality of sensor support holes to couple the sensor to the second sensor support.

21. The sensor mounting system of claim 19, comprising a sensor having mounting holes, wherein the mounting holes are configured to align with sensor support holes of the second plurality of sensor support holes to couple the sensor to the second sensor support, and wherein the mounting holes are not configured to align with sensor support holes of the first plurality of sensor support holes to couple the sensor to the first sensor support.

22. The sensor mounting system of claim 19, wherein the first sensor support includes a first flange configured to abut the cover to form a first space between the cover and a first body of the first sensor support, the second sensor support includes a second flange configured to abut the cover to form a second space between the cover and a second body of the second sensor support, and the first space and the second space are of different sizes.

23. The sensor mounting system of claim 22, comprising a fastener configured to extend through a cover hole of the cover and into the first flange to couple the first sensor support to the cover, wherein the fastener includes a distal end configured to terminate within the first space between the cover and the first body of the first sensor support.

24. The sensor mounting system of claim 19, wherein the first plurality of sensor support holes in the first orientation is configured to align with first sensor mounting holes of a first sensor, the second plurality of sensor support holes in the second orientation is configured to align with second sensor mounting holes of a second sensor, wherein the first sensor and the second sensor are configured to detect different operating parameters of the HVAC unit.

25. The sensor mounting system of claim 19, comprising a fastener configured to couple the cover to the panel of the HVAC unit, wherein the fastener is a self-locking screw, a self-tapping screw, or a rivet.

26. The sensor mounting system of claim 19, wherein the first plurality of sensor support holes is configured to align with a first set of sensors, the second plurality of sensor support holes is configured to align with a second set of sensors, the first set of sensors includes a type of sensor, and the second set of sensors does not include the type of sensor.

* * * * *